No. 726,844. PATENTED MAY 5, 1903.
F. J. BECKERMAN.
RIDING SADDLE.
APPLICATION FILED NOV. 12, 1902.
NO MODEL. 2 SHEETS—SHEET 1.
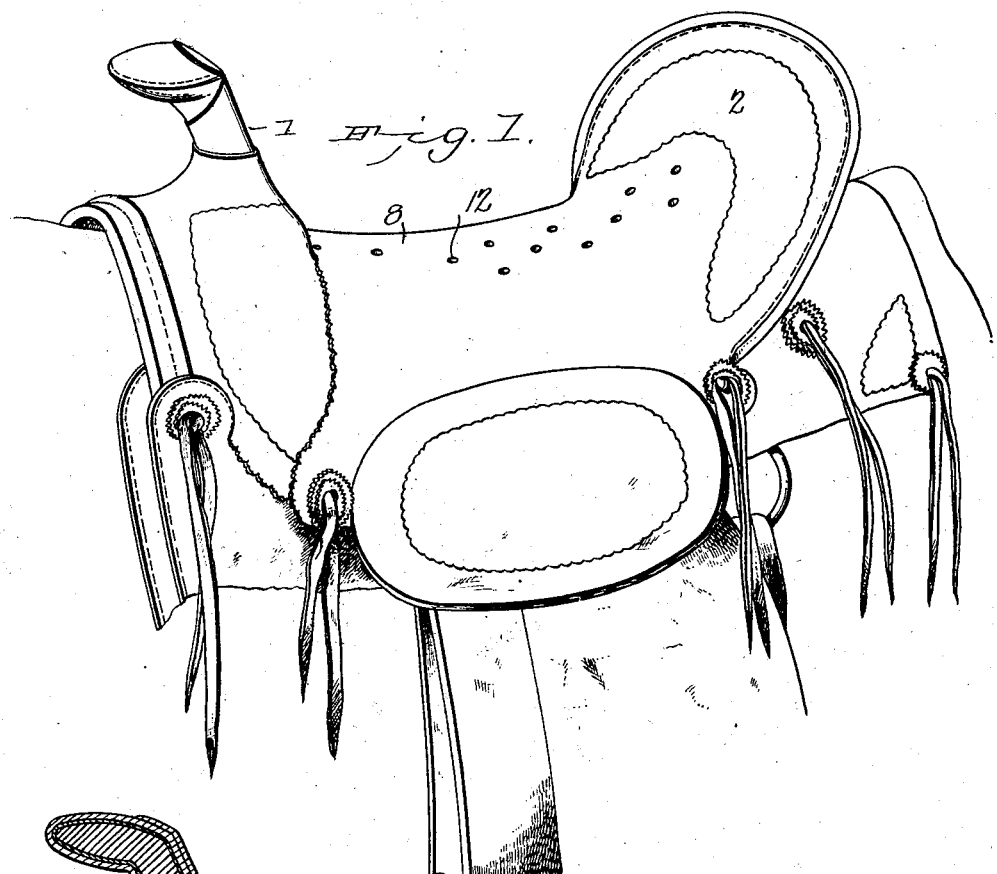
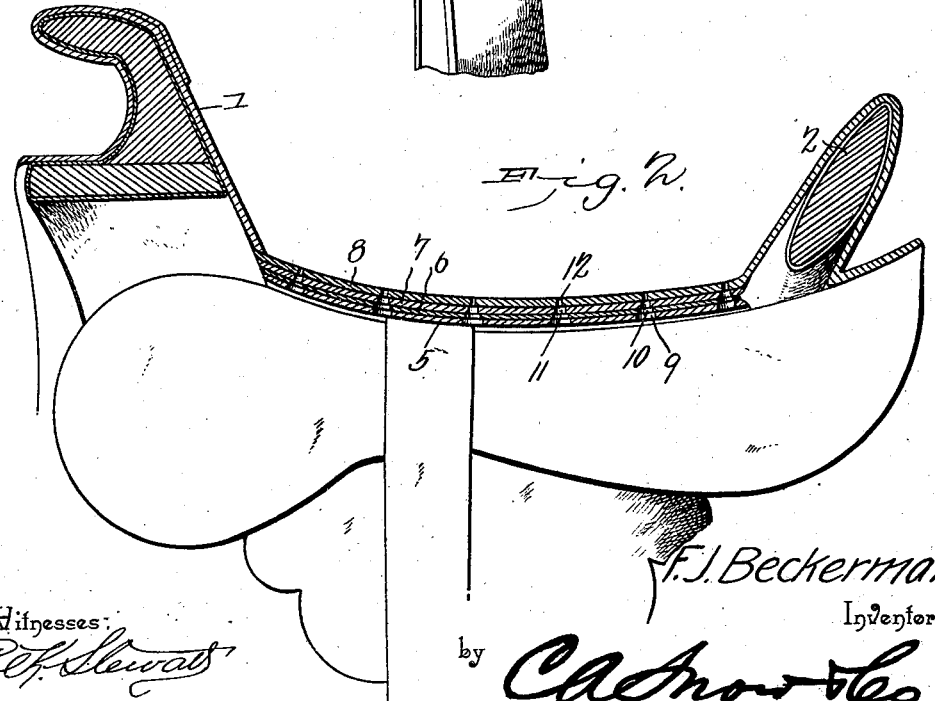

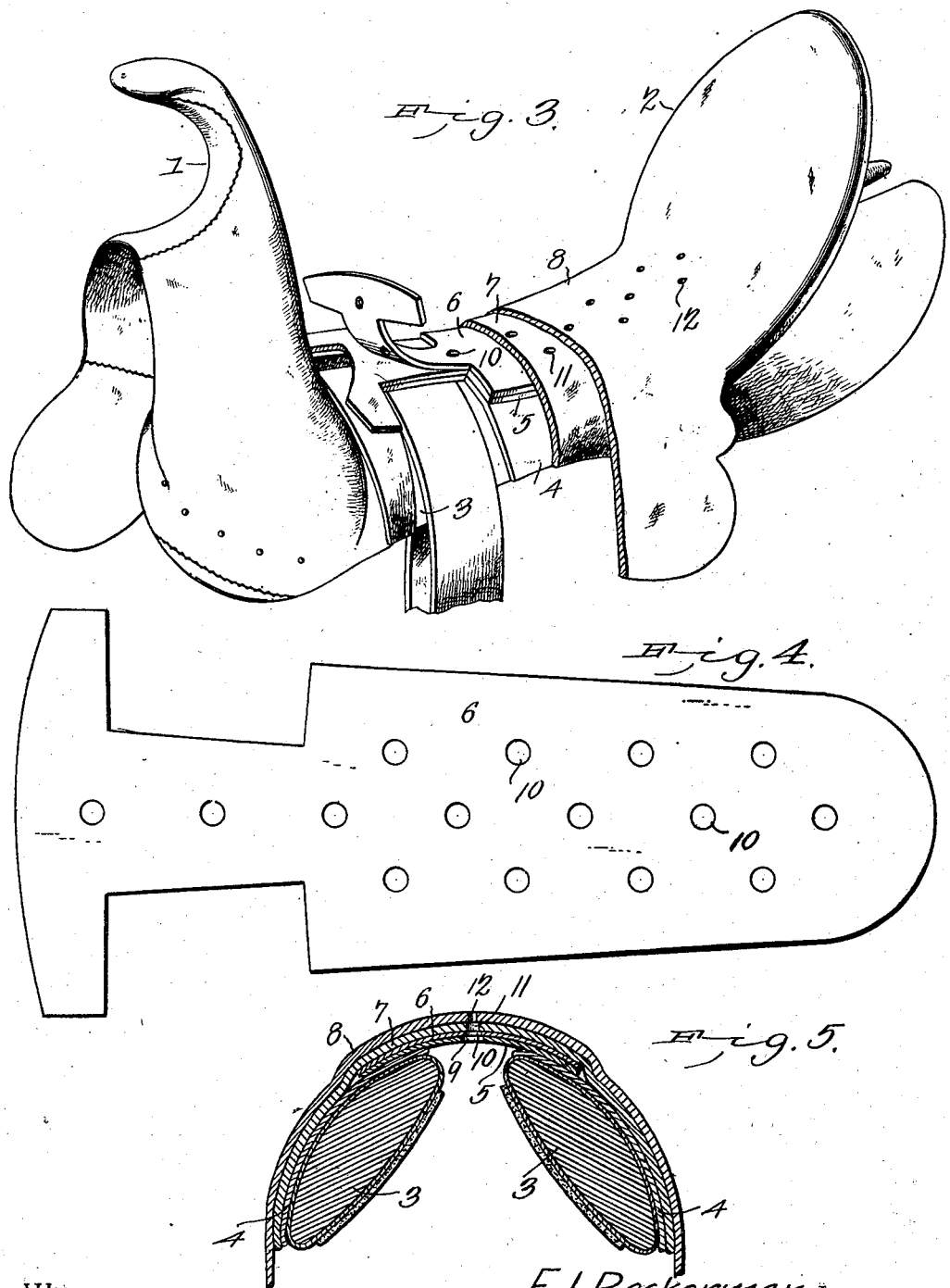

No. 726,844. Patented May 5, 1903.

UNITED STATES PATENT OFFICE.

FRED JOHN BECKERMAN, OF CAMERON, TEXAS.

RIDING-SADDLE.

SPECIFICATION forming part of Letters Patent No. 726,844, dated May 5, 1903.

Application filed November 12, 1902. Serial No. 131,021. (No model.)

*To all whom it may concern:*

Be it known that I, FRED JOHN BECKERMAN, a citizen of the United States, residing at Cameron, in the county of Milam and State of Texas, have invented a new and useful Riding-Saddle, of which the following is a specification.

This invention relates to riding-saddles.

The object of the invention is in a ready, simple, thoroughly-feasible, and practical manner and without materially adding to the cost of the saddle to effect thorough ventilation of its under surface, and thus dissipation of sweat and heat, thereby positively obviating scalding; furthermore, while effecting proper ventilation of the saddle, to prevent in a novel manner entrance of rain to its under side, which would be both objectionable and injurious.

With these and other objects in view, which will appear as the nature of the invention is better understood, the same consists in the novel construction and combination of parts of a ventilated riding-saddle, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of one form of saddle constructed in accordance with the present invention. Fig. 2 is a view in vertical longitudinal section. Fig. 3 is a perspective view, partly in section, showing the disposition of the different parts of the saddle. Fig. 4 is a view in elevation of the ventilating-plate. Fig. 5 is a view in transverse section.

The saddle herein shown is of the character commonly employed by ranchmen; but it is to be understood that the invention is equally adapted to other forms of saddles, and as this will be readily understood detailed illustration is deemed unnecessary.

Referring to the drawings, 1 designates the horn of the saddle, 2 the cantle, and 3 the side bars, these elements being combined to form a saddletree of the ordinary construction.

The gist of the present invention resides in the peculiar manner of ventilating the seat and in keeping the center portion of the saddle-seat out of contact with the animal's back, thereby to insure proper ventilation, avoid discomfort to the animal, and to permit passage of air between the saddle and the animal's back throughout its entire length when the animal is in motion. The seat portion is spaced from the side bars by lifts 4, consisting of appropriately-shaped pieces of leather, and bridging the space between the two side bars is a strainer 5, which rests upon the lifts, as clearly shown in Fig. 5. Disposed upon the strainer is a ventilator-plate 6, which constitutes one of the essential features of the present invention, the same being made of metal, such as heavy galvanized iron, possessing sufficient rigidity to hold that portion of the saddle between the side bars out of engagement with the animal's back. This ventilator-plate extends from a point near the rear end of the cantle to a point near the pommel, and covering the ventilator-plate and lifts is the ground-seat 7, and disposed over the ground-seat is the cover 8. The lifts, strainer, ventilator-plate, and ground-seat are provided at their sides with recesses to receive the stirrups, as usual, and each of the said parts is provided with a plurality of openings 9, 10, 11, and 12, respectively, as clearly shown in Fig. 2, the openings in the strainer being the largest and those in the succeeding parts being progressively decreased, thus presenting approximately cone-shaped openings. This arrangement is adopted for the reason that in addition to providing ample ventilation entrance of water to the interior of the saddle in case of rain is practically obviated, thus preventing injury to the saddle. Furthermore, by this disposition of the ventilating-openings they will not prove a source of discomfort to the rider, but, on the other hand, will add to his comfort by the ventilation produced.

In practice the ventilating-openings are disposed equidistant from each other, thereby preventing stretching or sagging of the leather at one place more than another.

By supporting the intermediate portion of the saddle above the animal's back in the manner described there will always be a current of air passing beneath the saddle when the animal is in motion, which will operate to evaporate sweat as rapidly as generated, adding thereby to the comfort of both the animal and the rider, and, further, positively obviating any scalding.

The manner herein shown in carrying the invention into effect is one that has been found thoroughly efficient; but it is to be understood that the invention may otherwise be embodied and still be within the scope thereof.

Having thus described the invention, what I claim is—

In a saddle, the combination with the side bars, of lifts disposed in the outer side thereof, a strainer bridging the space between the side bars, a reinforcing ventilating-plate disposed upon the strainer, and a ground-seat and cover, the strainer, ventilator-plate, ground-seat and cover being each provided with a plurality of openings that register and gradually decrease in diameter from the strainer outward.

In testimony that I claim the foregoing as my own I have hereto affixed my signature in the presence of two witnesses.

FRED JOHN BECKERMAN.

Witnesses:
JNO. B. MCLANE,
D. A. NEWMEN.